United States Patent
Terada et al.

(10) Patent No.: US 8,509,271 B2
(45) Date of Patent: Aug. 13, 2013

(54) METHOD FOR MANUFACTURING OPTICAL FIBER GRATING, OPTICAL FIBER GRATING, AND FIBER LASER

(71) Applicant: Fujikura Ltd., Tokyo (JP)

(72) Inventors: Yoshihiro Terada, Sakura (JP); Koji Omichi, Sakura (JP); Rintaro Morohashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/628,942

(22) Filed: Sep. 27, 2012

(65) Prior Publication Data

US 2013/0028275 A1 Jan. 31, 2013

Related U.S. Application Data

(63) Continuation of application No. PCT/JP2011/057861, filed on Mar. 29, 2011.

(30) Foreign Application Priority Data

Mar. 30, 2010 (JP) ............... P2010-078192
Jul. 29, 2010 (JP) ............... P2010-170528

(51) Int. Cl.
*H01S 3/30* (2006.01)
*H01S 3/08* (2006.01)
*G02B 6/34* (2006.01)

(52) U.S. Cl.
USPC ................. 372/6; 372/102; 385/37

(58) Field of Classification Search
USPC ............ 372/6, 50.11, 102; 385/37; 264/1.27
See application file for complete search history.

(56) References Cited

U.S. PATENT DOCUMENTS

| 5,367,588 A | 11/1994 | Hill et al. |
| 2009/0161701 A1 | 6/2009 | Furuya et al. |

FOREIGN PATENT DOCUMENTS

| JP | 7-140311 A | 6/1995 |
| JP | 7-191210 A | 7/1995 |
| JP | 2001-318242 A | 11/2001 |
| JP | 2002-048927 | * 2/2002 |
| JP | 2002-48927 A | 2/2002 |
| JP | 2003-004956 A | 1/2003 |
| JP | 2004-271689 A | 9/2004 |
| JP | 2004-279477 A | 10/2004 |
| JP | 2005-037850 | * 2/2005 |
| JP | 2005-37850 A | 2/2005 |
| WO | 2007/066641 A1 | 6/2007 |

OTHER PUBLICATIONS

International Search Report for Entry of PCT/JP2011/057861 dated Jun. 14, 2011.

* cited by examiner

*Primary Examiner* — Armando Rodriguez
(74) *Attorney, Agent, or Firm* — Sughrue Mion, PLLC

(57) ABSTRACT

A method for manufacturing an optical fiber grating that includes first and second gratings that configure an optical resonator, the method including: forming the first grating by radiating ultraviolet light to an optical fiber so that a irradiation intensity Z satisfies the following Equation 1: $Z \leq (\Delta\lambda_S/x + 0.04556Y^2 + 1.2225Y)/(0.05625Y^2 + 1.6125Y)$ . . . Equation 1, where, Z represents an irradiation intensity (mJ/mm²) of the ultraviolet light, $\Delta\lambda_S$ represents the maximum shift amount of a reflection center wavelength of the first grating that is allowed as long as reflection wavelengths of the first grating and second grating overlap each other, x represents a shift amount of the reflection center wavelength per temperature change of 1° C. (nm/° C.) in the first grating, and Y represents an intensity (W) of the wave-guided light.

7 Claims, 7 Drawing Sheets

METHOD FOR MANUFACTURING OPTICAL FIBER GRATING, OPTICAL FIBER GRATING, AND FIBER LASER

CROSS REFERENCE TO RELATED APPLICATIONS

This application is a continuation application based on a PCT Patent Application No. PCT/JP2011/057861, filed Mar. 29, 2011, whose priority is claimed on Japanese Patent Application No. 2010-078192 filed Mar. 30, 2010 and Japanese Patent Application No. 2010-170528 filed Jul. 29, 2010, the entire content of which are hereby incorporated by reference.

BACKGROUND OF THE INVENTION

1. Field of the Invention

The present invention relates to an optical fiber grating which is capable of suppressing shifts of a reflection wavelength, a method for manufacturing the optical fiber grating, and a fiber laser that includes the optical fiber.

2. Description of the Related Art

In an optical fiber grating, a structure (grating) in which a refractive index, a core diameter, and the like are periodically changed along the longitudinal direction (axial direction) of an optical fiber is formed. The optical fiber grating reflects light having a specific wavelength or combines with a cladding mode, and therefore, is capable of selectively causing a loss of light. In general, an optical fiber grating having a structure in which the refractive index is periodically changed is used. For example, the grating is manufactured by increasing the refractive index of a germanium-added silica glass through irradiation of ultraviolet light such as a KrF excimer laser or an Ar gas laser. The grating formed through the above-described method is capable of reflecting or transmitting light within a wavelength bandwidth having a center wavelength according to the design. The optical fiber grating is used widely in the field of an optical communication as an optical component or an optical device such as a wavelength selective filter, a gain equalizer of a light amplifier, or a wavelength dispersion compensator. FIG. 1 is a schematic configuration diagram of a fiber laser in which the optical fiber grating is applied as a reflection type wavelength selection filter and is used as an optical resonator. In a fiber laser 1 shown in the figure, a pump laser 11, a WDM coupler 12, a first grating 131, an amplification medium 14 such as a rare earth doped optical fiber, and a second grating 132 are connected to an optical fiber 15 in this order.

A center wavelength of a reflective wavelength bandwidth of the grating coincides with a Bragg wavelength that is determined based on a period of the grating structure and an effective refractive index of an optical fiber waveguide portion (optical fiber core portion). The period of the grating structure is changed according to a linear expansion coefficient of an optical fiber, the temperatures of the optical fiber itself and the surrounding environment, or the like. In addition, the effective refractive index of the optical fiber core portion is also changed according to the temperatures of the optical fiber itself and the surrounding environment. Therefore, the reflection wavelength of the grating is changed according to the temperature of the optical fiber itself or the surrounding environment.

In the general fiber laser 1 shown in FIG. 1, a laser oscillates at a wavelength region (a), as shown in FIG. 2A, in which the reflection wavelength of the first grating 131 and the reflection wavelength of the second grating 132 overlap each other. Thereby, as shown in FIG. 2B, if the structure and/or the core are changed so that the reflection wavelengths of the gratings do not overlap each other due to the above-described temperature change, the laser does not oscillate. Therefore, in the related art, in order to suppress shifts of the reflection wavelength of the grating, various methods in which a temperature compensation mechanism is provided in the optical fiber grating have been suggested (refer to Japanese Unexamined Patent Application, First Publication No. 2003-004956 and Japanese Unexamined Patent Application, First Publication No. 2001-318242).

In the fiber laser 1 shown in FIG. 1, in order to increase the oscillation efficiency of the laser and more stably perform laser oscillation, at least the first grating 131 of the first grating 131 and second grating 132 that configure the optical resonator use a grating having high reflectivity in the laser oscillation wavelength region. Here, it is ideal that the reflectivity be 99% or more. In order to increase the reflectivity of the grating, it is preferable to lengthen a periodic refractive index modulation structure portion in which the refractive index is periodically modulated or increase the refractive index modulation. However, if the periodic refractive index modulation structure portion is lengthened, the reflection wavelength bandwidth of the grating becomes narrow, and thus it is difficult to stably perform the laser oscillation at a desired oscillation wavelength. Therefore, in general, the reflectivity is increased by increasing the refractive index modulation. In order to increase the refractive index modulation, it is necessary to increase the irradiation intensity of ultraviolet light that is radiated to the optical fiber when the grating is formed or to lengthen the irradiation time.

However, if the irradiation time of the ultraviolet light is lengthened, due to fluctuation in air or a change in temperature during the irradiation, a minute deviation of the irradiation position of the ultraviolet light in the optical fiber may occur and the refractive index modulation portion may be blurred. In such a case, there are problems in that the refractive index modulation is not sufficiently increased and an optical fiber grating in which the laser oscillation is stably performed with high oscillation efficiency is not obtained.

On the other hand, when the irradiation intensity of the ultraviolet light is increased so as to obtain a sufficient refractive index modulation, in general, the irradiation of the ultraviolet light is performed at an intensity of approximately 3 mJ/mm². However, in the grating that is formed according to the above-described condition, the reflection wavelength is changed when it is used, and there is a problem in that an optical fiber grating is obtained which cannot stably oscillate the laser. The inventors carried out a thorough investigation into the cause, and as a result, found that a portion which absorbs wave-guided light is generated in regions to which the ultraviolet light is radiated when the grating is formed, and the reflection wavelength of the grating is shifted due to the absorption portion. That is, since the wave-guided light is absorbed in the absorption portion when the fiber laser is operated, the grating itself is heated, and at this time, a degree of generation of heat is changed according to the intensity of the wave-guided light and the reflection wavelength of the grating is changed.

In contrast, as described above, a method in which the temperature compensation mechanism is provided in the optical fiber grating has been suggested in order to suppress the changes of the temperatures of the optical fiber itself and the surrounding environment. However, in fact, a method which controls the generation of heat of the grating itself is yet to be disclosed. If the generation of heat of the grating can be controlled, it is considered that the shifts of the reflection wavelength of the optical fiber grating can be sufficiently and easily suppressed.

The present invention is made in view of the above-described circumstances, and has an object of providing an optical fiber grating capable of sufficiently suppressing shifts of a reflection wavelength by suppressing generation of heat of a grating, a method for manufacturing the same, and a fiber laser that includes the optical fiber grating and is capable of stably performing laser oscillation.

SUMMARY OF THE INVENTION

In order to solve the above-described problem, a method for manufacturing an optical fiber grating according to an aspect of the present invention, is a method for manufacturing an optical fiber grating that includes first and second gratings that configure an optical resonator, the method including: forming the first grating by radiating ultraviolet light to an optical fiber so that a irradiation intensity $Z$ satisfies the following Equation 1: $Z \leq (\Delta\lambda_S/x + 0.04556\ Y^2 + 1.2225\ Y)/(0.05625\ Y^2 + 1.6125\ Y)$ . . . Equation 1, where, $Z$ represents an irradiation intensity (mJ/mm$^2$) of the ultraviolet light, $\Delta\lambda_S$ represents the maximum shift amount of a reflection center wavelength of the first grating that is allowed as long as reflection wavelengths of the first grating and second grating overlap each other, $x$ represents a shift amount of the reflection center wavelength per temperature change of 1° C. (nm/° C.) in the first grating, and $Y$ represents an intensity (W) of the wave-guided light.

It may be arranged such that $\Delta\lambda_S$ is smaller one of absolute values of differences between a reflection center wavelength of the second grating and each wavelength in which a reflective spectrum intensity becomes a half value in the first grating.

It may be arranged such that when the temperature change in the first grating is positive, $\Delta\lambda_S$ is an absolute value of the difference between a reflection center wavelength of the second grating and a shorter one of wavelengths in which the reflective spectrum intensity becomes a half value in the first grating.

It may be arranged such that the irradiation intensity of the ultraviolet light is 1 to 3 mJ/mm$^2$.

An optical fiber grating according to an aspect of the present invention is obtained using the above-described manufacturing method, wherein the optical fiber grating satisfies at least one of the following Equations 4 to 6: $L_{700} \leq (\Delta\lambda_S/x + 0.04556Y^2 + 1.2225Y)/(0.05625Y^2 + 1.6125Y)/17.825$ . . . Equation 4, $L_{750} \leq (\Delta\lambda_S/x + 0.04556Y^2 + 1.2225Y)/(0.05625Y^2 + 1.6125Y)/26.316$ . . . Equation 5, $L_{800} \leq (\Delta\lambda_S/x + 0.04556Y^2 + 1.2225Y)/(0.05625Y^2 + 1.6125Y)/40$ . . . Equation 6, where, $L_{700}$ represents a loss amount per 1 mm (dB/mm) in the length of the first grating when wave-guided light having a wavelength of 700 nm is propagated, $L_{750}$ represents a loss amount per 1 mm (dB/mm) in the length of the first grating when wave-guided light having a wavelength of 750 nm is propagated, and $L_{800}$ represents a loss amount per 1 mm (dB/mm) in the length of the first grating when wave-guided light having a wavelength of 800 nm is propagated.

It may be arranged such that the optical fiber grating satisfies all of Equations 4 to 6.

An optical fiber laser according to an aspect of the present invention includes the above-described optical fiber grating.

According to the aspects of the present invention, in the optical fiber grating, the generation of heat of the grating is suppressed, and the shifts of the reflection wavelength can be sufficiently suppressed. In addition, by using the optical fiber grating, it is possible to obtain an optical component or an optical device such as a fiber laser that has high oscillation efficiency and that can stably perform the laser oscillation.

DETAILED DESCRIPTION OF THE PREFERRED EMBODIMENTS

<Method of Manufacturing Optical Fiber Grating>

A method of manufacturing an optical fiber grating according to an embodiment of the present invention is a method of manufacturing an optical fiber grating that includes first and second gratings configuring an optical resonator, in which the first grating is formed by radiating ultraviolet light to an optical fiber so as to satisfy Equation 1 below.

$$Z \leq (\Delta\lambda_S/x + 0.04556Y^2 + 1.2225Y)/(0.05625Y^2 + 1.6125Y) \quad (1)$$

In the above equation, Z represents an irradiation intensity (mJ/mm²) of the ultraviolet light, $\Delta\lambda_S$ represents the maximum shift amount of a reflection center wavelength of the first grating that is allowed as long as reflection wavelengths of the first and second gratings overlap each other, x represents a shift amount of the reflection center wavelength per temperature change of 1° C. (nm/° C.) in the first grating, and Y represents intensity (W) of the wave-guided light.

For example, the reflectivity of the first grating is 99% or more, and a half value width of a reflection spectrum intensity (hereinafter, this may be abbreviated to $\Delta\lambda$) is 0.1 nm or more.

In the manufacturing method according to an embodiment of the present invention, when the shifts of the reflection wavelength is suppressed to be within a permissible range, a temperature increase value of the grating (an allowed temperature increase value of the grating) having reflectivity of 99% or more is approximated by a function of the irradiation intensity (Z) of the ultraviolet light when the grating is formed and the intensity (W) of the wave-guided light, and then an upper limit of the irradiation intensity (Z) of the ultraviolet light is defined from the relationship as shown in Equation 1. The relationship in Equation 1 is found for the first time by the inventors.

For example, the optical fiber that is provided for forming the grating thereon may be a known fiber that includes a silica glass core to which a dopant such as germanium (Ge) is added, and a silica glass cladding.

The grating can be formed by radiating the ultraviolet light to the optical fiber. The refractive index increases at a portion to which the ultraviolet light is radiated, and a desired refractive index modulation structure can be formed. At this time, in order to enhance the increase rate of the refractive index, it is preferable to use an optical fiber in which hydrogen molecules are diffused. The optical fiber may also be optical fibers that are obtained using the known method.

In the present embodiment, in the first grating and the second grating that form the optical fiber, the reflectivity of at least the first grating is 99% or more, and $\Delta\lambda$ of the first grating is 0.1 nm or more. The reflectivity and $\Delta\lambda$ can be adjusted by appropriately adjusting the irradiation condition of the ultraviolet light.

Figure 1:
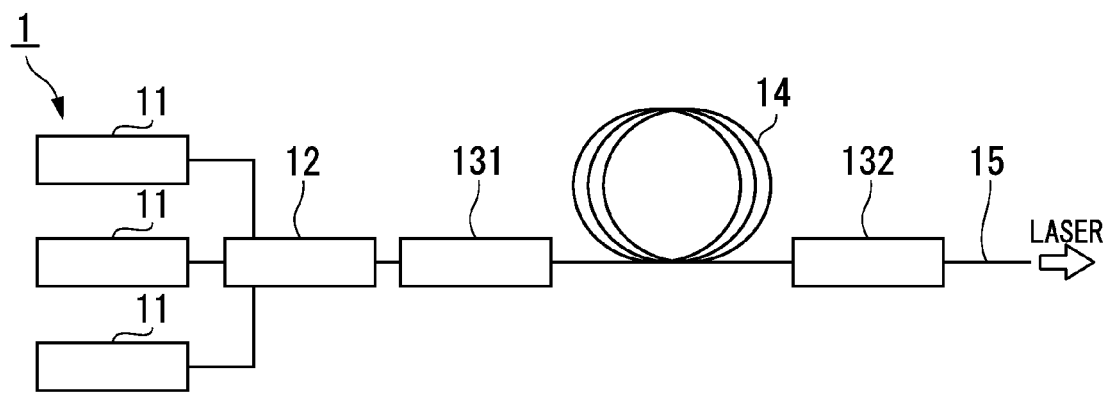
FIG. 1 is a schematic configuration diagram that illustrates a fiber laser.

Since the optical resonator is configured of the grating having reflectivity of 99% or more, the fiber laser can stably perform a laser oscillation with high oscillation efficiency. For example, in the fiber laser 1 shown in FIG. 1, it may be arranged such that the reflectivity of at least the first grating 131 which is closer to the pump laser 11 is 99% or more. The second grating 132 does not generate heat through the propagation of the wave-guided light.

Figure 2A:
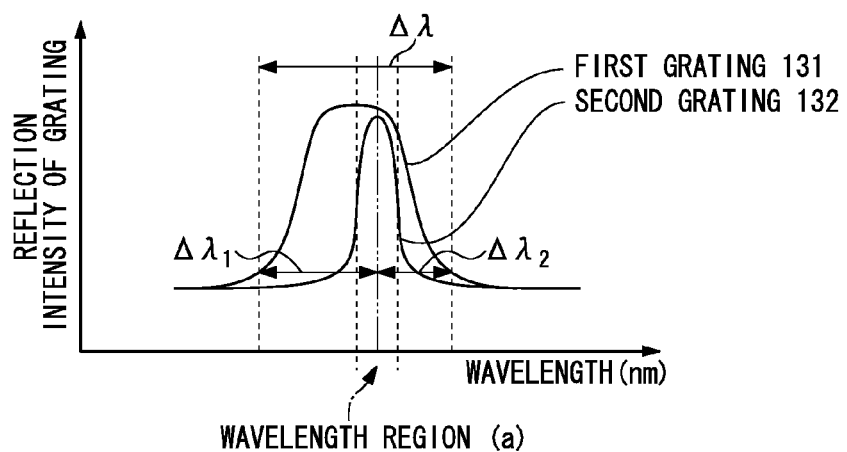
FIG. 2A is a graph illustrating a relationship between presence or absence of overlapping of a reflection wavelength and presence or absence of oscillation of a fiber laser in two optical fiber gratings.
Figure 2B:
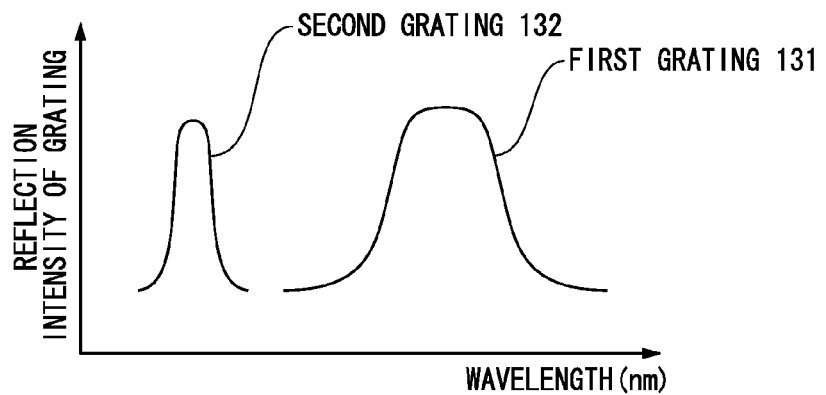
FIG. 2B is a graph illustrating a relationship between the presence or the absence of overlapping of the reflection wavelength and the presence or the absence of oscillation of the fiber laser in two optical fiber gratings.

In addition, since the optical resonator is configured of the grating in which $\Delta\mu$ is 0.1 nm or more, the reflection wavelengths of two gratings easily overlap each other, and the fiber laser can stably perform the laser oscillation with high oscillation efficiency. For example, FIG. 2A shows an aspect in which the wavelength of the first grating 131 having reflectivity of 99% or more and $\Delta\lambda$ of 0.1 nm or more and the wavelength of the second grating 132 overlap each other in the fiber laser 1.

$\Delta\lambda$ is preferably 0.4 to 0.6 nm, and is more preferably approximately 0.5 nm.

It is preferable that the difference in reflection center wavelengths between the first grating 131 and the second grating 132 be as small as possible, and it is more preferable that the difference be not present (the reflection center wavelengths coincide with each other).

Next, the basis of Equation 1 will be described.

When the wave-guided light is propagated through the grating portion having reflectivity of 99% or more, a portion of the wave-guided light may be absorbed at the grating portion, and as a result, heat may be generated. The temperature change in the grating causes the shifts of the reflection wavelength of the grating as the temperature change of the surrounding environment of the grating does. Here, the "wave-guided light" is light which is propagated through the optical fiber and corresponds to an excitation light (pumping light) for exciting an amplification medium, amplified signal light (laser oscillation light), or the like in the case of the fiber laser.

It is considered that the reason why the wave-guided light is absorbed at the grating portion is that an absorption portion is generated due to the irradiation of the ultraviolet light when the grating is formed. Here, it is considered that the "absorption portion" is derived from to a structure defect due to a dopant such as germanium (Ge) in a silica glass core or a volume change of a silica glass. In addition, it is considered that a dispersion absorption (Rayleigh scattering) is generated according to the structure inconsistency of the glass in the absorption portion. The temperature increase value due to the generation of heat at the absorption portion is approximately proportional to the intensity of the wave-guided light.

Figure 3:
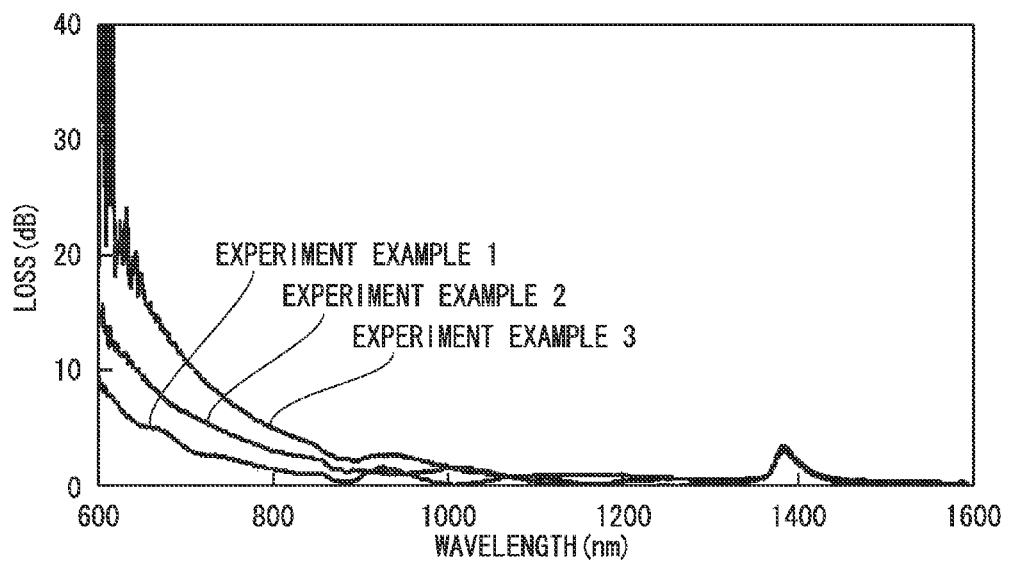
FIG. 3 is a graph showing an absorption characteristic of wave-guided light of a grating that is formed by radiating ultraviolet light to a hydrotreated optical fiber.

FIG. 3 is a graph showing an absorption characteristic of the wave-guided light of the grating that is formed by radiating ultraviolet light to a hydrotreated optical fiber.

The optical fiber that is provided for formation of the grating thereon includes a silica glass core which is doped with $GeO_2$ in a concentration of 2.3 mol % and a silica glass cladding, a core diameter is 9 μm, a cladding diameter is 125 μm, a relative refractive index difference (Δ) of the core is 0.23%, and a cutoff wavelength is 945 nm. The optical fiber shown here is an example of an optical fiber that is preferable in the present invention.

The optical fiber is hydrotreated at a condition of 300 atmospheric pressure, 50° C., and 100 hours.

The wavelength of the irradiated ultraviolet light is 248 nm, the irradiation intensity is 1 mJ/mm² (Experiment Example 1), is 2 mJ/mm² (Experiment Example 2), and is 3 mJ/mm² (Experiment Example 3). Moreover, the irradiation hour is 120 minutes (Experiment Example 1), is 60 minutes (Experiment Example 2), and is 40 minutes (Experiment Example 3). In addition, white light having a wavelength of 400 to 1800 nm is used as the wave-guided light, the white light is incident on one end of the optical fiber grating, and the spectrum of the transmitted light is measured using a spectrum analyzer at the other end.

As shown in FIG. 3, particularly, in Experiment Examples 2 and 3, the absorption of the wave-guided light is abruptly increased at wavelength regions in which the wavelength is lower than 800 nm, and the absorption crosses up to a region equal to or more than 1000 nm in a wide range. Therefore, for example, the wave-guided light having the wavelengths of 915 nm, 980 nm, 1063 nm, or the like can also be absorbed and heat can be generated at the grating portion. On the other hand, the similar tendency is observed in Experiment Example 1. However, the absorption of the wave-guided light is suppressed. In this way, the absorption of the wave-guided light is generated in an ultraviolet light irradiation portion (grating). The greater the irradiation intensity of the ultraviolet light is, the greater the absorbed amount of the wave-guided light is.

Figure 4:
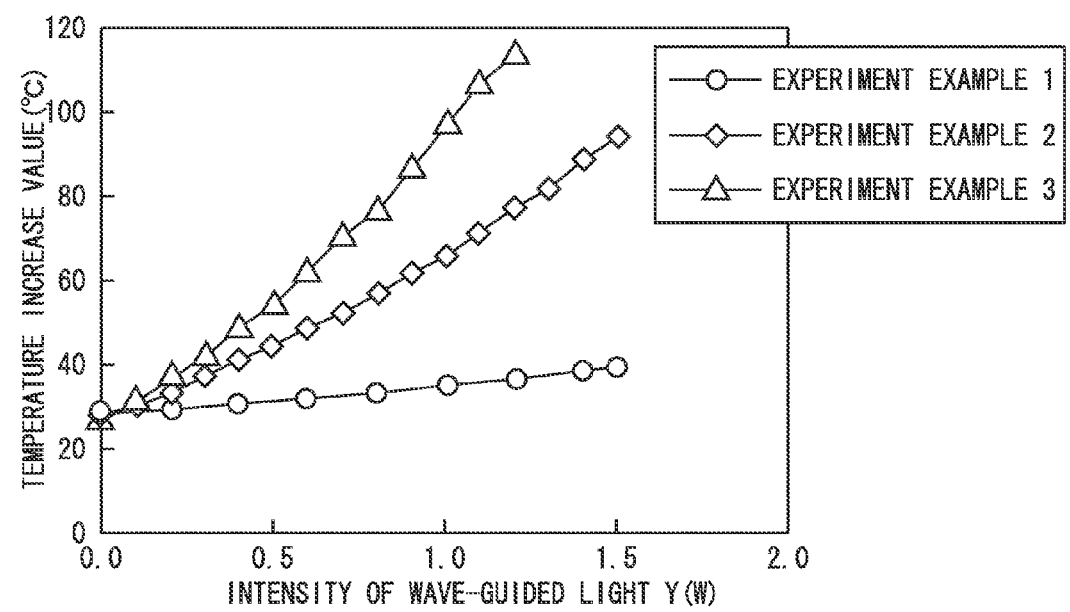
FIG. 4 is a graph showing a relationship (temperature characteristic) between intensity of the wave-guided light of the optical fiber grating having the absorption characteristic shown in FIG. 3 and a temperature of an ultraviolet light irradiation portion.

In addition, FIG. 4 shows a temperature characteristic of the optical fiber grating having the absorption characteristic shown in FIG. 3, when a laser having the wavelength of 1050 nm is incident on one end as the wave-guided light, the intensity of the wave-guided light is measured using calorimeter at the other end, and the temperature of the grating is measured from the side surfaces using a thermocamera.

As shown in FIG. 4, the greater the irradiation intensity of the ultraviolet light is, the greater the temperature increase value of the grating is. In addition, in the same irradiation intensity, the greater the intensity of the wave-guided light is, the greater the temperature increase value of the grating is.

Moreover, for example, since the results shown in FIGS. 3 and 4 are also observed when the ultraviolet light is radiated via a phase mask at the time of the formation of the grating, the results do not depend on the presence or the absence of the phase mask. For example, the method of manufacturing the grating in which the ultraviolet light is radiated via the phase mask is disclosed in Japanese Unexamined Patent Application, First Publication No. 2002-48927.

As described above, in order to increase the reflectivity of the grating in the related art, the irradiation intensity of the ultraviolet light that is radiated to the optical fiber when forming the grating is approximately 3 mJ/mm². In the grating that is formed as described above, there is a problem in that the reflection wavelength is changed when using the grating. The reason is considered because heat is generated at the grating due to the absorption portion.

On the other hand, as described above, when the irradiation time of the ultraviolet light at the time of forming the grating is lengthened, a minute deviation is occurred at the irradiation portion of the ultraviolet light in the optical fiber due to fluctuation in air or a change in temperature during the irradiation, and thus there is a problem in that the refractive index modulation portion is blurred. However, it is considered that generation of the absorption portion of the wave-guided light is suppressed.

Therefore, the temperature measurement of the grating was performed while variously changing the irradiation intensity of the ultraviolet light and the intensity of the wave-guided light in the grating when forming the grating having reflectivity of 99% or more and $\Delta\lambda$ of 0.1 nm or more to examine the shifts of the reflection wavelength in the grating. As a result, it was found that a temperature increase value $\Delta T$ of the grating (first grating) when the wave-guided light is propagated satisfies a relationship that is approximated by Equation 2 below. A smaller $\Delta T$ means that the heat generation of the grating is more suppressed.

Equation 2 below is completely new and can be derived from Examples described below.

$$\Delta T = (0.05625Z - 0.04556)Y^2 + (1.6125Z - 1.2225)Y \quad (2)$$

In the above equation, $\Delta T$ represents the temperature increase value (° C.) when the wave-guided light is propagated, Z represents the irradiation intensity (mJ/mm²) of the ultraviolet light, and Y represents the intensity (W) of the wave-guided light.

In Equation 2, Y represents the intensity (W) of the wave-guided light, is a value that is set according to an intended purpose of an optical component or an optical device that includes the optical fiber grating according to the present embodiment, and is not particularly limited. However, considering versatility or the like of the optical fiber grating, for example, a number range of Y is preferably 25 W or less, and is more preferably 20 W or less.

Z represents the irradiation intensity (mJ/mm²) of the ultraviolet light when the grating is formed, and may be appropriately adjusted according to Y. For example, when Y is the above-described number range, Z is preferably 0.2 to 5 mJ/mm², is more preferably 0.5 to 4 mJ/mm², and is most preferably 1 to 3 mJ/mm².

For example, the case of the first grating 131 and the second grating 132 shown in FIG. 2A is considered. Before a desired light is incident to the optical fiber grating (Y is 0, that is, a case where the temperature increase value $\Delta T$ of the first grating 131 is 0(° C.)), the relationship of "$\Delta\lambda = \Delta\lambda_1 + \Delta\lambda_2$" is satisfied where absolute values of differences between the reflection center wavelength of the second grating 132 and wavelengths of ends of $\Delta\lambda$ in the first grating 131 are $\Delta\lambda_1$ and $\Delta\lambda_2$, respectively. $\Delta\lambda_1$ represents the absolute value of the difference between the reflection center wavelength of the second grating 132 and the shorter one of the wavelengths of both ends of $\Delta\lambda$, and $\Delta\lambda_2$ represents the absolute value of the difference between the reflection center wavelength of the second grating 132 and the longer one of the wavelengths of both ends of $\Delta\lambda$.

When light is incident to the optical fiber grating and the wave-guided light is propagated through the first grating 131 having reflectivity of 99% or more, the shift amount of the reflection center wavelength of the first grating 131 is "x×$\Delta T$ (nm)", where the temperature increase is $\Delta T$(° C.) in the first grating 131 and the shift amount of the reflection center wavelength per temperature change of 1° C. in the first grating 131 is x (nm/° C.). That is, the reflection center wavelength of the first grating 131 shifts by x×$\Delta T$ (nm) to longer wavelengths.

When the smaller one of $\Delta\lambda_1$ and $\Delta\lambda_2$ is $\Delta\lambda_S$ (in FIG. 2A, $\Delta\lambda_2$ is $\Delta\lambda_S$), if the relationship of "x×$\Delta T \leq \Delta\lambda_S$" is satisfied, the reflection wavelengths of the first grating 131 and second grating 132 overlap each other. Since the optical resonator is configured of the above-described grating, the optical fiber grating can stably perform a laser oscillation.

Therefore, it is preferable that the relationship which is represented by Equation 3 below be satisfied.

$$\Delta T \leq \Delta\lambda_S / x \quad (3)$$

In the above equation, $\Delta\lambda_S$ is the same as the above, $\Delta T$ represents the temperature increase value of the first grating when the wave-guided light is propagated, and x represents the shift amount of the reflection center wavelength per temperature change of 1° C. (nm/° C.) in the first grating.

In addition, in general, the temperature change of the first grating 131 when the wave-guided light is propagated is positive. In this case, in the example of FIG. 2A ($\Delta\lambda_1 > \Delta\lambda_2$), if the shift amount of the reflection center wavelength of the first grating 131 is $\Delta\lambda_1$ or less, the reflection wavelengths of the first grating 131 and second grating 132 overlap each other. That is, if the temperature change of the first grating 131 when the wave-guided light is propagated is positive, in Equation 3 described above, the shift amount $\Delta\lambda_S$ of the reflection center wavelength of the first grating 131 may be an absolute value $\Delta\lambda_1$ of the difference between the reflection center wavelength of the second grating 132 and the shorter one of the wavelengths in which reflective spectrum intensity becomes a half value in the first grating 131.

The reflection wavelength of the grating is proportional to an effective refractive index according to a material that constitutes the optical fiber and is dependent on temperature. For example, x is obtained by measuring deviation (nm) of the reflection center wavelength of the grating when the temperature of the grating is changed by 1° C. x is preferably 0.005 to 0.02 and more preferably approximately 0.01. In most cases, the optical fiber that is generally used satisfies the above-described range of x.

$\Delta\lambda_S$ and x can be adjusted through a structure of the grating, a material that constitutes the optical fiber, or the like according to the well-known methods.

$\Delta T$ shown in Equation 2 is substituted into Equation 3, which is rearranged with respect to Z, and thereby, Equation 1 below is obtained.

$$Z \leq (\Delta\lambda_S/x + 0.04556Y^2 + 1.2225Y)/(0.05625Y^2 + 1.6125Y) \quad (1)$$

In the above equation, Z, $\Delta\lambda_S$, x, and Y are the same as the above.

That is, in the first grating and second grating that are formed so that the ultraviolet light is radiated so as to satisfy the relationship of Equation 1, the overlapping of the reflection wavelengths is not prevented.

According to the present embodiment, the ultraviolet light is radiated to the optical fiber so as to satisfy Equation 1, and thereby, shifts of the reflection wavelength can be suppressed. In addition, since the irradiation of the ultraviolet light satisfies Equation 1, heat generation of the grating is suppressed to be within a permissible range. Moreover, in the present embodiment, considering the possible intensity of the wave-guided light in the optical fiber grating, the values of $\Delta\lambda_S$ and x, the irradiation intensity of the ultraviolet light is determined. Therefore, for example, if the irradiation intensity is determined so that the shifts of the reflection wavelength in the first grating is suppressed to be within a permissible range, unlike the related art, a problem due to the irradiation of the ultraviolet light having the greater intensity than necessary does not occur. In addition, if the irradiation intensity of the ultraviolet light is not less than necessary and the irradiation intensity is determined so that the shifts of the reflection wavelength in the first grating is suppressed to be within a permissible range, unlike the related art, a problem due to excessive lengthening of the irradiation time of the ultraviolet light does not occur. As described above, the manufacturing method according to the present embodiment is completely different from the manufacturing method of the related art in that the irradiation intensity of the ultraviolet light which is practically required can be specified. For example, even though the irradiation intensity of the ultraviolet light has a greater value of approximately 3 mJ/mm², an optical fiber grating which is capable of being applied to an optical component or an optical device can be manufactured.

According to the manufacturing method of the present embodiment, except that the irradiation intensity of the ultraviolet light is adjusted as described above, the optical fiber grating can be formed according to the method in the same way as that of the related art.

For example, as the ultraviolet light that is radiated, a KrF excimer laser light, a double wave of an Ar gas laser, or the like is used.

Moreover, in the manufacturing method according to the present embodiment, the well-known method for stably forming the grating may be used together. The method that is used together is not particularly limited as long as effects of the present invention are not disturbed. (i) A method in which the optical fiber is radiated while scanning the optical fiber with the ultraviolet light along the longitudinal direction of the optical fiber (refer to Japanese Unexamined Patent Application, First Publication No. 2002-48927) and (ii) a method in which the ultraviolet light is radiated to a phase mask and the ultraviolet light that has a periodic intensity distribution generated by interference between diffraction rays is radiated along the longitudinal direction of the optical fiber (refer to Japanese Unexamined Patent Application, First Publication No. 2004-279477 and Japanese Unexamined Patent Application, First Publication No. 2004-271689) may be given as examples.

In the method of (i), since the ultraviolet light scans the optical fiber, deviation of the irradiation intensity of the ultraviolet light is averaged. That is, according to the method of (i), since the deviation of the irradiation intensity of the ultraviolet light or the deviation of the intensity over time of the ultraviolet light in the irradiation surface is suppressed based on a state change over time of an ultraviolet light irradiation device, even though the irradiation time is lengthened, the grating is formed to be more stable.

In the method of (ii), a thickness of the phase mask is set so that the interference between the diffraction rays generated due to the reflection of the ultraviolet light in the phase mask is not prevented, thereby the irradiation time can be shortened and the grating can be formed to be more stable. In addition, since inert gases such as argon (Ar), nitrogen ($N_2$), and helium (He) flow between the optical fiber and the phase mask and evaporated matters generated at the time of the irradiation of the ultraviolet light are prevented from being attached to the phase mask, the irradiation time can be shortened, and the grating can be formed so as to be stable.

In the optical fiber grating that is manufactured using the method according to the present embodiment, since the wave-guided light has a predetermined intensity and the temperature increase value in the first grating is suppressed to be within a permissible range, the shifts of the reflection wavelength is suppressed. In addition, an optical component or an optical device that is configured using the optical fiber grating has an excellent optical characteristic. For example, the fiber laser in which the optical resonator is configured with the optical fiber grating has a significantly improved oscillation efficiency or stability.

<Optical Fiber Grating>

The optical fiber grating according to an embodiment of the present invention is an optical fiber grating that is obtained using the manufacturing method according to the embodiment and satisfies at least one of the following Equations 4 to 6.

$$L_{700} \leq (\Delta\mu_S/x + 0.04556Y^2 + 1.2225Y)/(0.05625Y^2 + 1.6125Y)/17.825 \quad (4)$$

$$L_{750} \leq (\Delta\lambda_S/x + 0.04556Y^2 + 1.2225Y)/(0.05625Y^2 + 1.6125Y)/26.316 \quad (5)$$

$$L_{800} \leq (\Delta\lambda_S/x + 0.04556Y^2 + 1.2225Y)/(0.05625Y^2 + 1.6125Y)/40 \quad (6)$$

In the above equation, $L_{700}$ represents the loss amount per 1 mm (dB/mm) in the length of the first grating when the wave-guided light having the wavelength of 700 nm is propagated, $L_{750}$ represents the loss amount per 1 mm (dB/mm) in the length of the first grating when the wave-guided light having the wavelength of 750 nm is propagated, $L_{800}$ represents the loss amount per 1 mm (dB/mm) in the length of the first grating when the wave-guided light having the wavelength of 800 nm is propagated; $\Delta\lambda_S$ represents the maximum shift amount of the reflection center wavelength of the first grating that is allowed as long as reflection wavelengths of the first grating and second grating overlap each other; x represents the shift amount of the reflection center wavelength per temperature change of 1° C. (nm/° C.) of the first grating; and Y represents the intensity (W) of the wave-guided light.

The relationships shown in Equations 4 to 6 are initially founded by the inventors.

In Equations 4 to 6, $L_{700}$ represents the loss amount per 1 mm (dB/mm) in the length of the first grating when the wave-guided light having the wavelength of 700 nm is propagated, $L_{750}$ represents the loss amount per 1 mm (dB/mm) in the length of the first grating when the wave-guided light having the wavelength of 750 nm is propagated, and $L_{800}$ represents the loss amount per 1 mm (dB/mm) in the length of the first grating when the wave-guided light having the wavelength of 800 nm is propagated.

In addition, $\Delta\lambda_S$, x, and Y are the same as $\Delta\lambda_S$, x, and Y of Equation 1. For example, it is preferable that $\Delta\lambda_S$ be a smaller one of absolute values of differences between the reflection center wavelength of the second grating and each wavelength in which the reflective spectrum intensity becomes a half value in the first grating. When the temperature change in the first grating is positive, it is preferable that $\Delta\lambda_S$ be an absolute value of the difference between the reflection center wavelength of the second grating and the shorter one of the wavelengths in which the reflective spectrum intensity becomes a half value in the first grating.

Next, the bases of Equations 4 to 6 will be described.

Figure 7:
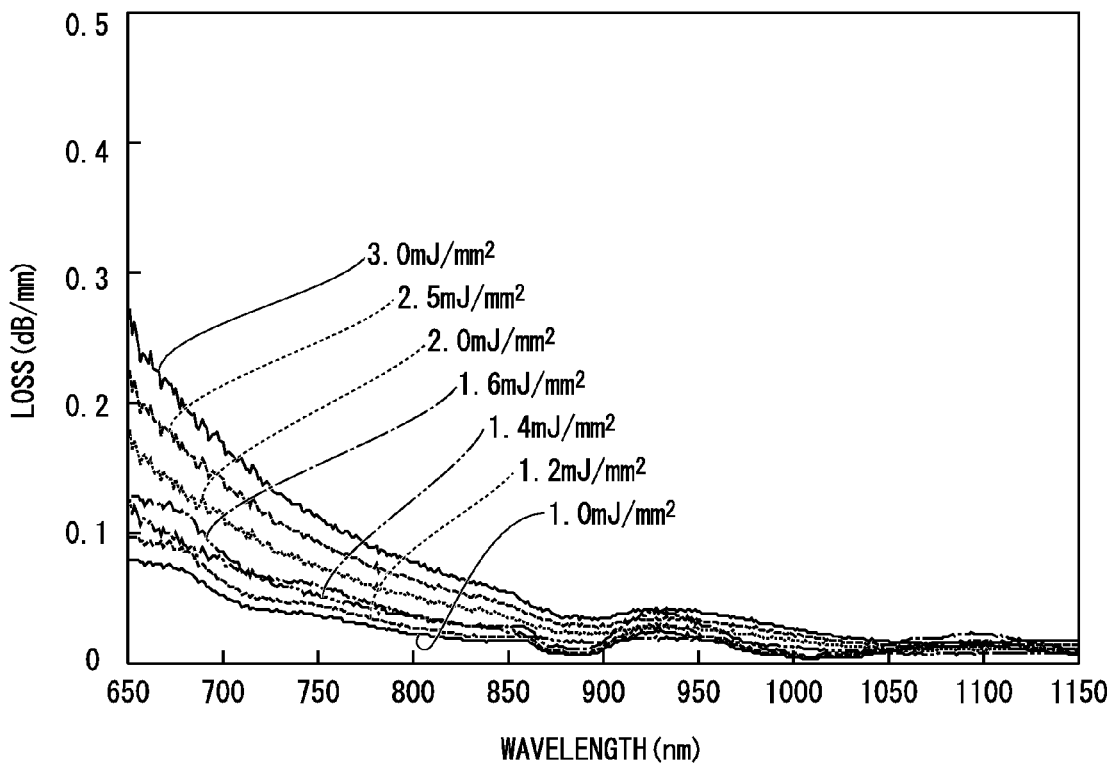
FIG. 7 is a graph showing a relationship between the irradiation intensity of the ultraviolet light when a first grating is formed and loss amount per 1 mm (dB/mm) of a length of the first grating when the wave-guided light is propagated in the optical fiber grating that is manufactured using a method according to an embodiment of the present invention.

In the optical fiber grating that is manufactured using the method according to the embodiment, in the first grating, the reflectivity is 99% or more, and $\Delta\lambda$ is 0.1 nm or more, for example. In FIG. 7, in the optical fiber grating, the relationship (absorption characteristic) between the wavelength of the wave-guided light that is propagated and the loss amount per 1 mm (dB/mm) in the length of the first grating when the wave-guided light is propagated, which was examined for each irradiation intensity of the ultraviolet light at the time of forming the first grating, are shown. Here, the optical fiber that is supplied to form the grating is the same as that which is supplied to form the grating having the absorption characteristic of the wave-guided light shown in FIG. 3. That is, the optical fiber includes a silica glass core which is doped with $GeO_2$ in a concentration of 2.3 mol % and a silica glass cladding, in which the core diameter is 9 μm, the cladding diameter is 125 μm, the relative refractive index difference (Δ) of the core is 0.23%, and the cutoff wavelength is 945 nm. In addition, the optical fiber is hydrotreated at a condition of 300 atmospheric pressure, 50° C., and 100 hours.

Figure 8:
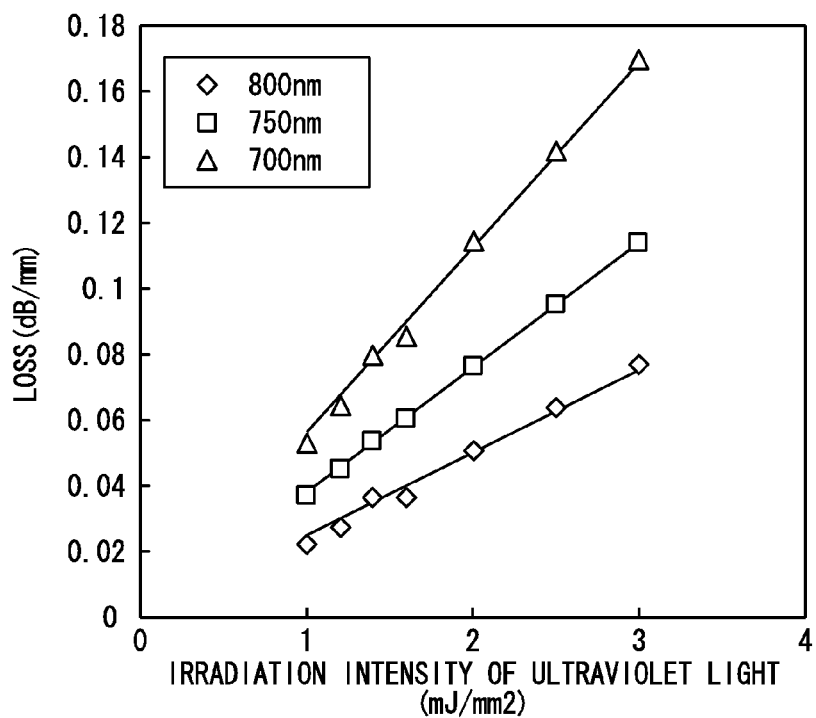
FIG. 8 is a graph showing a relationship between the loss amount per 1 mm (dB/mm) of the length of the first grating when the wave-guided light of each wavelength is propagated and the irradiation intensity of the ultraviolet light when the first grating is formed, which are obtained from the absorption characteristic shown in FIG. 7.

Moreover, relationships between the loss amounts per 1 mm (dB/mm) in the length of the first grating when the wave-guided light having the wavelengths of 700 nm, 750 nm, and 800 nm is propagated and the irradiation intensity of the ultraviolet light when the first grating is formed are obtained from the results shown in FIG. 7, results shown in FIG. 8 are obtained. From the results shown in FIG. 8, relationships that are approximated by Equations 7 to 9 below are derived. Equations 7 to 9 are not known so far, are completely new, and can be derived from Examples described below. It should be noted that, when the wavelengths are 700 nm, 750 nm, and 800 nm (Equations 7, 8, and 9 below) in FIG. 8, correlation coefficients with respect to the loss amounts and the irradiation intensity of the ultraviolet light are 0.9956, 0.9997, and 0.9849 respectively.

$$L_{700}=0.0561\times Z \tag{7}$$

$$L_{750}=0.0380\times Z \tag{8}$$

$$L_{800}=0.0250\times Z \tag{9}$$

In the above equations, $L_{700}$, $L_{750}$, $L_{800}$, and Z are the same as the above.

Moreover, if Equations 7 to 9 are rearranged with respect to Z, Equations 10 to 12 below are respectively obtained. Equations 10 to 12 below also are completely new.

$$Z=17.825\times L_{700} \tag{10}$$

$$Z=26.316\times L_{750} \tag{11}$$

$$Z=40.000\times L_{800} \tag{12}$$

In the above equations, $L_{700}$, $L_{750}$, $L_{800}$, and Z are the same as the above.

Since the optical fiber grating satisfies Equation 1, Z shown in Equations 10 to 12 is substituted into Equation 1, which is rearranged with respect to $L_{700}$, $L_{750}$, and $L_{800}$, and Equations 4 to 6 are respectively obtained.

$$L_{700}\leq(\Delta\lambda_S/x+0.04556Y^2+1.2225Y)/(0.05625Y^2+1.6125Y)/17.825 \tag{4}$$

$$L_{750}\leq(\Delta\lambda_S/x+0.04556Y^2+1.2225Y)/(0.05625Y^2+1.6125Y)/26.316 \tag{5}$$

$$L_{800}\leq(\Delta\lambda_S/x+0.04556Y^2+1.2225Y)/(0.05625Y^2+1.6125Y)/40 \tag{6}$$

In the above equations, $L_{700}$, $L_{750}$, $L_{800}$, $\Delta\lambda_S$, x, and Y are the same as the above.

The optical fiber according to the present invention satisfies at least one of the above-described Equations 4 to 6. The optical fiber satisfies preferably two or more of Equations 4 to 6, and satisfies more preferably all Equations 4 to 6.

In the present embodiment, as the wavelength of the wave-guided light for definition of the loss amount per 1 mm in the length of the first grating, 700 nm, 750 nm, and 800 nm are selected. The reason is because, as is obvious from the graph of FIG. 7, the difference in loss amount at the same wavelength are relatively large between the different irradiation intensities of the ultraviolet light when the first grating is formed, and an approximate equation of the relationship between the loss amount (dB/mm) and the irradiation intensity of the ultraviolet light as shown in FIG. 8 can be more correctly and easily derived. The wavelength region that is suitable so as to derive the approximate equation is approximately 850 nm or less from FIG. 7, and three wavelengths such as 700 nm, 750 nm, and 800 nm are particularly selected from the wavelength region.

Moreover, as is obvious from FIG. 7, the loss amount generally increases in association with a decrease of the wavelength in the wavelength region of 850 nm or less regardless of the irradiation intensity of the ultraviolet light. Moreover, there is a trend in the wavelength region that the greater the irradiation intensity of the ultraviolet light is, the greater the loss amount in the same wavelength is. Therefore, in order to specify the optical fiber grating according to the present embodiment, the loss amount may be specified (satisfies at least one of Equations 4 to 6) at least one wavelength in the wavelength region. In addition, if the loss amount is specified at preferably two wavelengths, more preferably three wavelengths, more improved optical fiber grating can be specified.

When considering the application of the optical fiber grating to an optical component or an optical device, the value of the loss amount when the wavelength of the propagated wave-guided light is, for example, approximately 950 to 1100 nm, particularly 1063 nm is also important. However, since the value of the loss amount in the wavelength region is small, it is difficult to correctly measure the loss amount. Therefore, the wavelength of 850 nm or less is selected and the optical fiber grating is specified. Moreover, when the wavelengths other than 700 nm, 750 nm, and 800 nm are selected as the wavelength of the wave-guided light that defines the loss amount, new relational expressions may be obtained instead of Equations 7 to 9 in the selected wavelength.

<Fiber Laser>

A fiber laser according to an embodiment of the present invention includes the optical fiber grating according to the above-described embodiment.

The fiber laser according to the present embodiment may have a configuration similar to that of the fiber laser of the related art except of including the optical fiber grating according to the present embodiment instead of the optical fiber grating of the related art.

Figure 5:
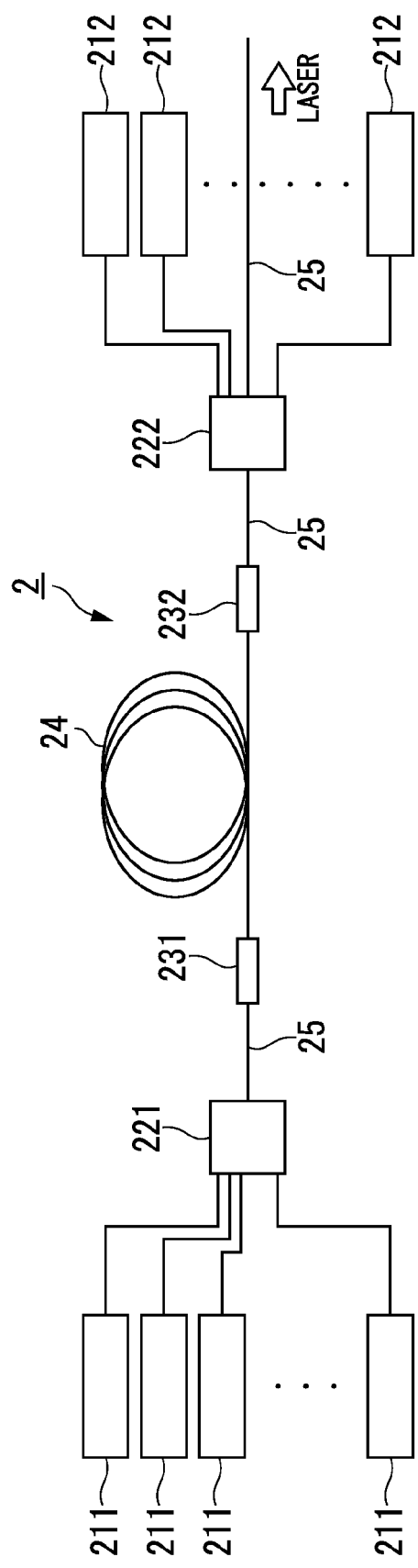
FIG. 5 is a schematic configuration diagram that illustrates a fiber laser according to an embodiment of the present invention.

FIG. 5 is a schematic configuration diagram that illustrates a fiber laser according to the present embodiment.

In a fiber laser 2 shown in the figure, a first pump laser 211, a first pump combiner 221, a first grating 231, an amplification medium 24 such as a rare earth doped optical fiber, a second grating 232, a second pump combiner 222, and a second pump laser 212 are connected to an optical fiber 25 in this order.

The first grating 231 is formed using the method according to the above-described embodiment and has reflectivity of 99% or more and Δλ of 0.1 nm or more.

The reflectivity, Δμ, and the like in the second grating 232 may be optionally set according to the purpose.

The first grating 231 is connected to one end of the amplification medium 24, the second grating 232 is connected to the other end thereof, and these all configure an optical resonator.

A plurality of first pump lasers 211 are disposed in parallel, and each of them is connected to the first pump combiner 221. Similarly, a plurality of second pump lasers 212 are disposed in parallel, and each of them is connected to the second pump combiner 222. The number of the first pump lasers 211 and the second pump lasers 212 may be optionally set according to the purpose.

The first pump laser 211, the first pump combiner 221, the amplification medium 24, the second grating 232, the second pump combiner 222, the second pump laser 212, and the optical fiber 25 may use the known those and may be optionally selected according to the purposes.

In the fiber laser 2, excitation light from the first pump lasers 211 is guided to the amplification medium 24 through the first pump combiner 221. Excitation light from the second pump lasers 212 is also guided to the amplification medium 24 through the second pump combiner 222. As shown by an arrow in the figure, the laser that is amplified through the optical resonator finally exits from the second pump combiner 222.

The fiber laser according to the present embodiment is not limited to those shown here, and a portion of the present embodiment may be modified or added within a scope which does not disturb effects of the present invention. For example, in the fiber laser 1 of FIG. 1 that is illustrated as the fiber laser of the related art, a fiber laser may be used in which the grating formed using the method according to the above-described embodiment is applied to the first grating 131.

The fiber laser according to the present embodiment may be manufactured in the same way as that of the fiber laser of the related art except of using the optical fiber grating according to the embodiment instead of the optical fiber grating of the related art.

Since the fiber laser according to the present embodiment includes the optical fiber grating according to the above-described embodiment, when light is guided with a predetermined intensity, the temperature increase value in the first grating is suppressed to be within a permissible range, and the shifts of the reflection wavelength is suppressed. As a result, oscillation efficiency or stability of the laser is significantly improved.

EXAMPLE

Hereinafter, the present invention will be described in more detail with reference to concrete Examples. However, the present invention is not limited to Examples shown below.

Example 1

Considering the possible intensity of the wave-guided light at the time of use, the ultraviolet light was radiated to the optical fiber based on the method according to the above-described embodiment, and a grating having reflectivity of 99% or more and Δλ of 0.1 nm or more was formed. An optical fiber was used which includes a silica glass core doped with $GeO_2$ in a concentration of 2.3 mol % and a silica glass cladding, in which the core diameter is 9 μm, the cladding diameter is 125 μm, the relative refractive index difference (Δ) of the core is 0.23%, and the cutoff wavelength is 945 nm. The optical fiber was hydrotreated at a condition of 300 atmospheric pressure, 50° C., and 100 hours, and thereafter, was subjected to the irradiation of the ultraviolet light. The wavelength of the irradiated ultraviolet light was 248 nm, and the irradiation time was appropriately adjusted so as to obtain the reflectivity of 99% or more.

In addition, it was implemented at ten different irradiation intensities, 1.0 $mJ/mm^2$ (Example 1-1), 1.1 $mJ/mm^2$ (Example 1-2), 1.2 $mJ/mm^2$ (Example 1-3), 1.3 $mJ/mm^2$ (Example 1-4), 1.4 $mJ/mm^2$ (Example 1-5), 1.6 $mJ/mm^2$ (Example 1-6), 1.8 $mJ/mm^2$ (Example 1-7), 2.0 $mJ/mm^2$ (Example 1-8), 2.5 $mJ/mm^2$ (Example 1-9), and 3.0 $mJ/mm^2$ (Example 1-10).

A laser having a wavelength of 1050 nm was incident to one end of the obtained optical fiber grating, the intensity of the wave-guided light was measured by a calorimeter at the other end, and the temperature of the grating was measured by a thermocamera from the side surface thereof. At this time, a graph showing the temperature characteristics is shown in FIG. 6.

Figure 6:
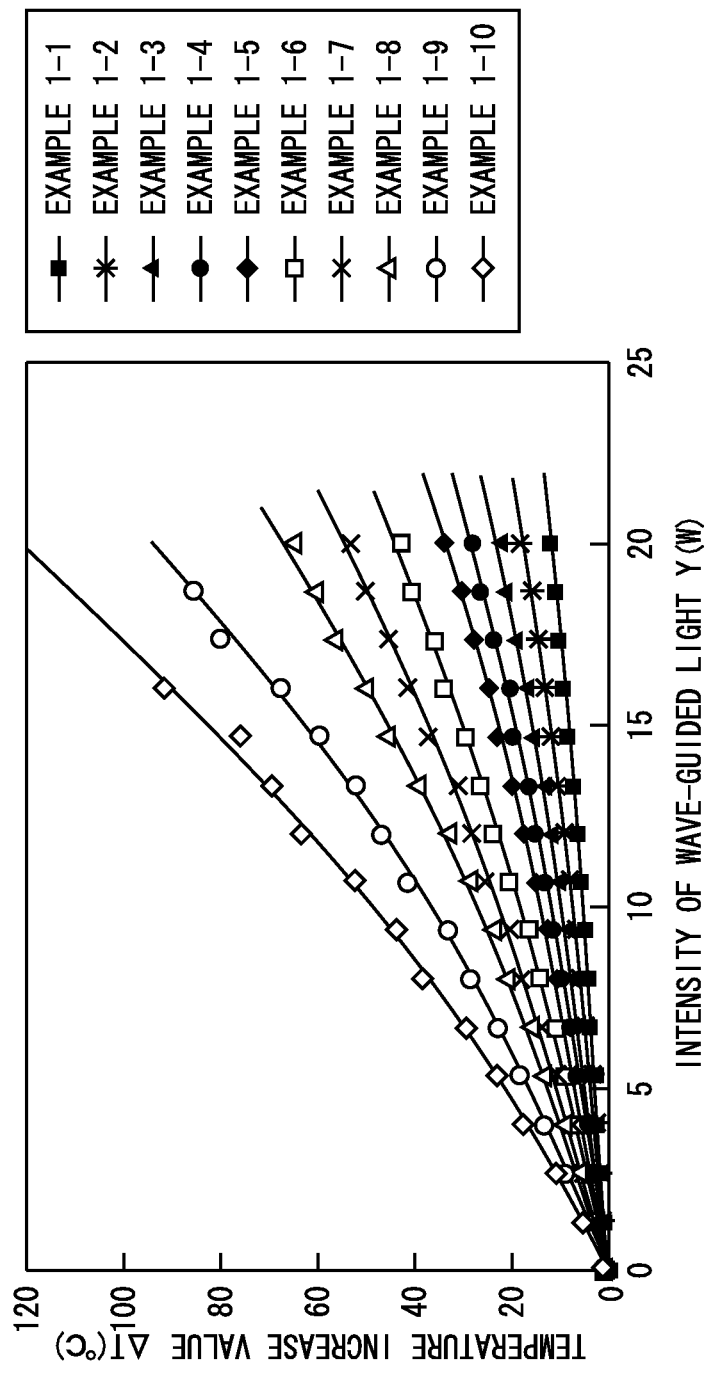
FIG. 6 is a graph showing a relationship (temperature characteristic) between the intensity of the wave-guided light of the optical fiber grating and the temperature of the ultraviolet light irradiation portion for each irradiation intensity of the ultraviolet light in Example 1.

All temperature characteristics in the case of Examples 1-1 to 1-10 shown in FIG. 6 satisfied the relationship that was approximated by Equation 2. In addition, Y was set so as to satisfy Equation 1, light was incident, and the wave-guided light was propagated. As a result, in all Examples, heat generation of the grating was suppressed, and the shifts of the reflection wavelength were suppressed. In this way, it was confirmed that the irradiation intensity (Z) of the ultraviolet light was less than or equal to a predetermined value with respect to the specific wave-guided light intensity (Y), and thereby the heat generation of the grating is suppressed and the shifts of the reflection wavelength were suppressed. For example, in the present example, since $Δλ_S$ is about 0.25 and x was about 0.01, Z may be 1.45 or less when Y is 15.

Comparative Example 1

A grating was formed in the same way as Example 1 except that Z was set so as not to satisfy Equation 1. Light was incident, and as a result, suppression of the heat generation of the grating was not sufficient, and the shifts of the reflection wavelength were increased. For example, Z was set to 2.0 when Y was 15, and thereby the temperature increase value of the grating was increased.

Example 2

With respect to the optical fiber grating that was manufactured according to Example 1, a loss spectrum in the grating was measured using a spectrum analyzer while employing white light with wavelengths of 400 to 1800 nm as the wave-guided light. The relationship (absorption characteristic) between the wavelength of the propagated wave-guided light and the loss amount per 1 mm (dB/mm) in the length of the first grating when the wave-guided light was propagated is shown in FIG. 7 for each irradiation intensity of the ultraviolet light when the first grating was formed.

Moreover, from the results shown in FIG. 7, the relationship between the loss amount per 1 mm (dB/mm) in the length of the first grating when the wave-guided light having wavelengths of 700 nm, 750 nm, and 800 nm was propagated and the irradiation intensity of the ultraviolet light when the first grating was formed was obtained. The results are shown in FIG. 8. The absorption characteristic shown in FIG. 8 satisfied all relationships that are approximated by Equations 7 to 9.

In addition, the obtained optical fiber gratings satisfied all Equations 4 to 6.

Example 3

A first grating was formed using a method in the same way as that of Example 1 except that the irradiation intensity of the ultraviolet light when the grating was formed was set as shown in Table 1, and the fiber laser 2 shown in FIG. 5 including the optical fiber grating was manufactured.

In the first grating 231, the reflectivity was set to 99.5% and $\Delta\lambda$ was set to 0.5 nm. In the second grating 232, the reflectivity was set to 10% and $\Delta\lambda$ was set to 0.1 nm. Moreover, the reflection center wavelengths of the first grating 231 and the second grating 232 are 1063.00 nm and coincided to each other.

As the first pump lasers 211 and the second pump lasers 212, pump lasers which had 6 mW in the maximum output per one at a wavelength of 915 nm were used. A total of twenty-eight pump lasers including fourteen first pump lasers 211 and fourteen second pump lasers 212 were disposed.

Figure 9:
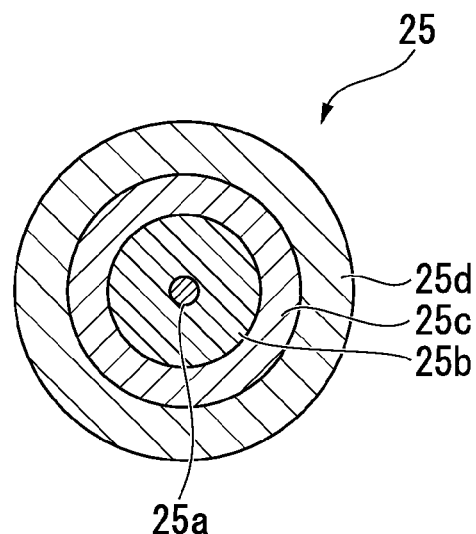
FIG. 9 is a schematic cross-sectional view showing the optical fiber that is used in a fiber laser of Example 3.

As the optical fiber 25, as shown in FIG. 9, a double-cladding optical fiber was used in which a first cladding 25b, a second cladding 25c, and a protective coating layer 25d were laminated in a core 25a in this order. The first grating 231 and second grating 232 were formed using the optical fiber 25. As the amplification medium 24, an amplification medium including a structure in which the core 25a of the optical fiber 25 was doped with ytterbium (Yb) was used.

The fiber laser 2 was operated, and excitation light beams from the first pump lasers 211 and the second pump lasers 212 were coupled to the first cladding 25b of the optical fiber 25 through the first pump combiner 221 and the second pump combiner 222 respectively, and were guided to the amplification medium 24. In addition, the optical fiber grating (first grating 231 and second grating 232) was formed in the core. Therefore, since most of the excitation light beams were guided into the first cladding of the optical fiber and were not guided into the core, the excitation light beams did not affect the heat generation of the first grating 231 that was formed in the core. On the other hand, since the laser that was amplified by the optical resonator was guided into the core, the laser generated heat of the first grating 231.

Figure 10:
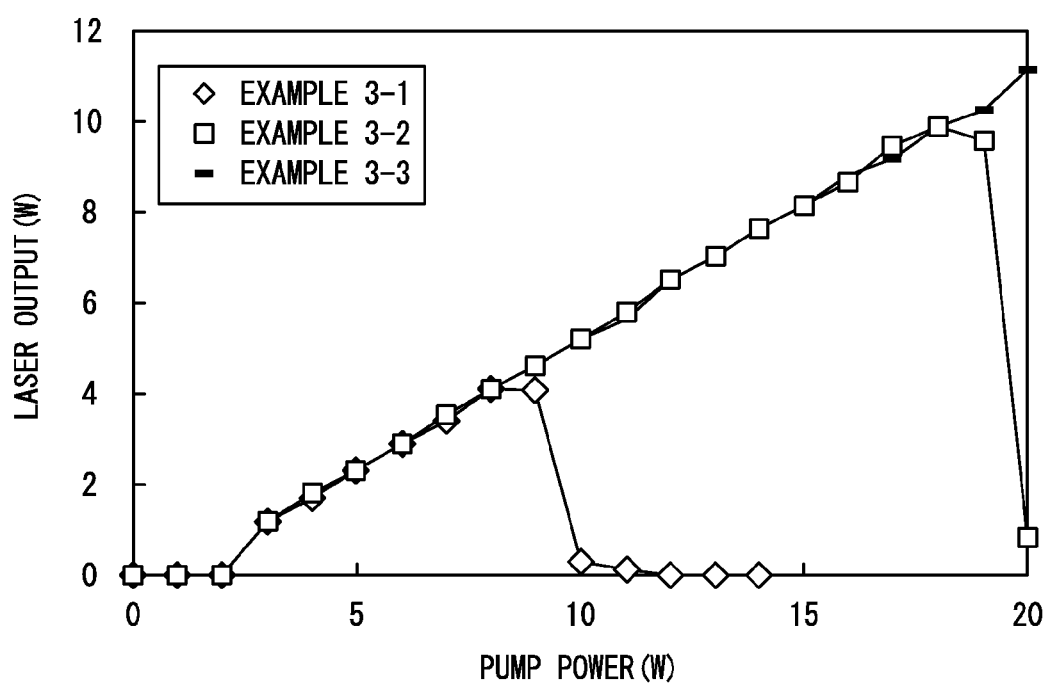
FIG. 10 is a graph showing a relationship between a laser output of the fiber laser and a pump power in Examples 3-1, 3-2 and 3-8.
Figure 11:
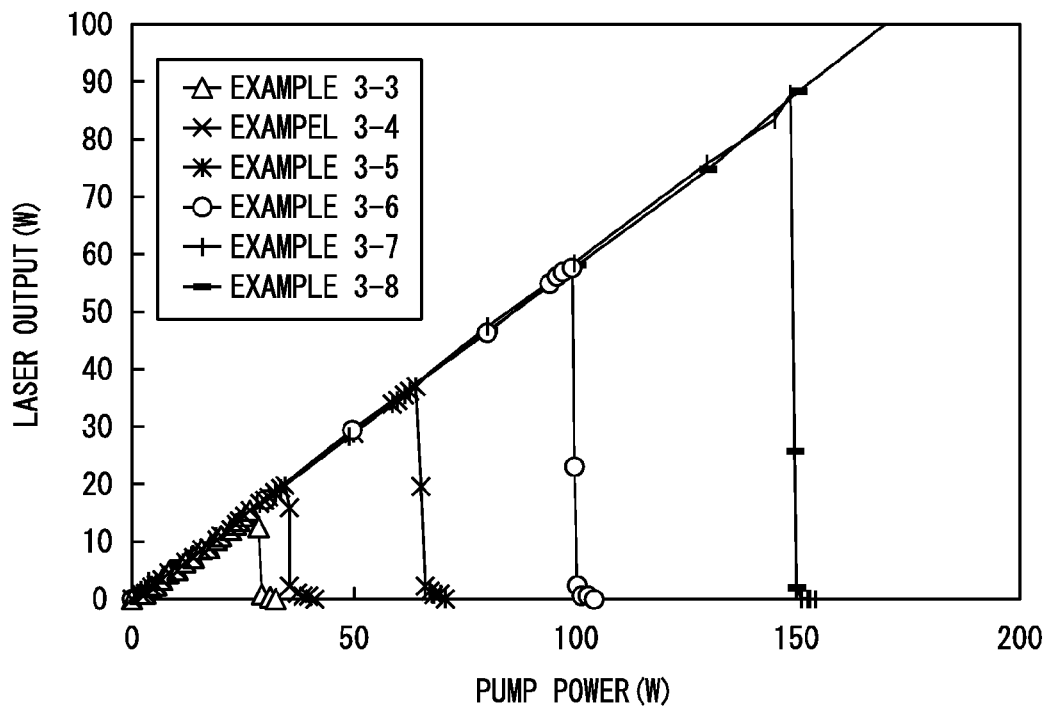
FIG. 11 is a graph showing a relationship between the laser output of the fiber laser and the pump power in Examples 3-3 to 3-8.
Figure 12:
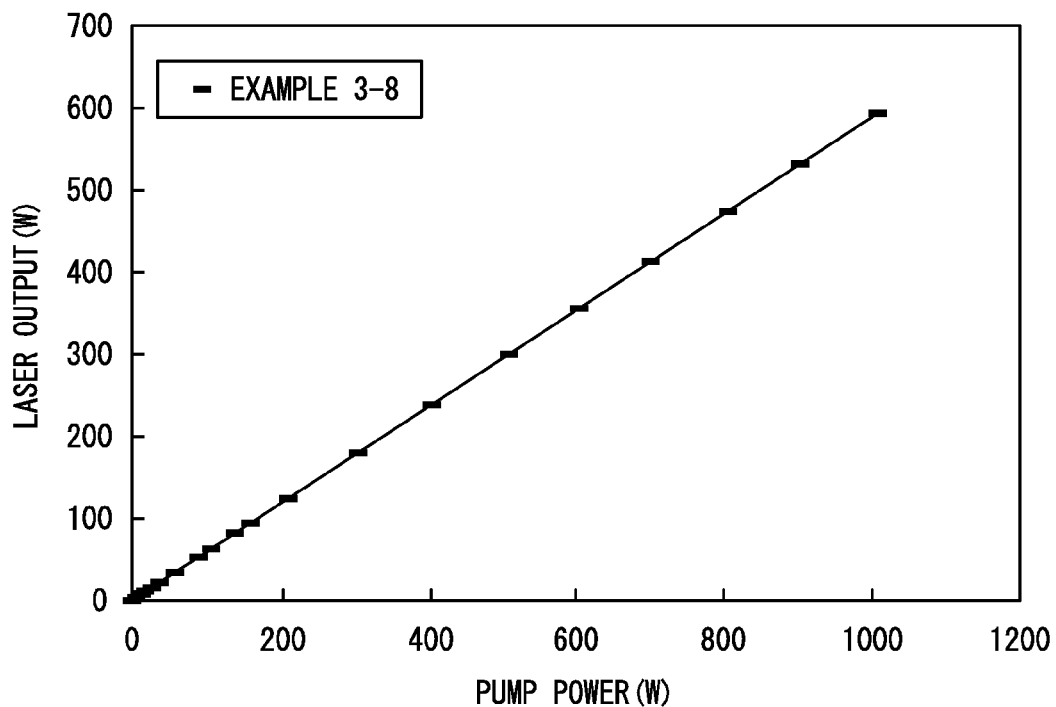
FIG. 12 is a graph showing a relationship between the laser output of the fiber laser and the pump power in Example 3-8.

Next, the fiber laser 2 was operated, the laser output (W) of the fiber laser 2 was measured, and relationships between the laser output and total amount of the excitation light (pump power) (W) from the first pump lasers 211 and second pump lasers 212 were confirmed. Graphs showing these relationships are shown in FIGS. 10 to 12. FIG. 10 is a graph showing the relationship between the laser power and the pump power in Examples 3-1, 3-2, and 3-8, FIG. 11 is a graph showing the relationship between these in Examples 3-3 to 3-8, and FIG. 12 is a graph showing the relationship between these in Example 3-8.

TABLE 1

| Fiber Laser | Irradiation Intensity of Ultraviolet Light (mJ/mm$^2$) |
|---|---|
| Example 3-1 | 4.00 |
| Example 3-2 | 2.00 |
| Example 3-3 | 1.50 |
| Example 3-4 | 1.30 |
| Example 3-5 | 1.00 |
| Example 3-6 | 0.90 |
| Example 3-7 | 0.85 |
| Example 3-8 | 0.80 |

As is obvious from FIG. 10, in Examples 3-1 and 3-2, the laser output increases in association with the increase of the pump power. However, if the laser output exceeds a particular value, the laser output abruptly decreases to become zero, and the laser oscillation cannot be performed. It is considered that this is because the first grating 231 was heated due to the amplified laser, and, as a result, the deviation in reflection center wavelength occurred between the first grating 231 and the second grating 232, and therefore the first grating 231 and the second grating 232 were not able to function as the optical resonator.

In addition, as is obvious from FIGS. 10 and 11, it was confirmed that the value of the laser output where the laser oscillation cannot be performed increases in accordance with the decrease of the irradiation intensity of the ultraviolet light at the time of using the grating. This means that the heat generation of the first grating 231 due to the amplified laser is suppressed in accordance with the decrease of the irradiation intensity of the ultraviolet light and the grating can function as the optical resonator for up to the greater value of the laser output. That is, if the irradiation intensity (Z) of the ultraviolet light is set to a predetermined value or less with respect to a specific wave-guided light intensity (Y), heat generation of the grating will be suppressed, and the shifts of the reflection wavelength will be suppressed. For example, in order to stably perform the laser oscillation at the laser output of 50 W, as is obvious from the results of Examples 3-6 to 3-8, the irradiation intensity of the ultraviolet light at the time of forming the first grating may be 0.90 mJ/mm$^2$ or less. As is obvious from FIG. 15 (Example 3-8), when the irradiation intensity of the ultraviolet light at the time of forming the first grating was 0.90 mJ/mm$^2$, the laser oscillation could be stably performed even at the laser output of 500 W or more.

In this way, it was confirmed that the optical fiber grating formed by radiating the ultraviolet light so as to satisfy Equation 1 satisfied all Equations 4 to 6; and in the fiber laser including the optical fiber grating, since the temperature increase value in the first grating was suppressed to be within a permissible range and the shifts of the reflection wavelength were suppressed, the oscillation efficiency or the stability of the laser was significantly improved.

The present invention can be used in optical components or optical devices such as a wavelength selective filter, a gain equalizer of a light amplifier, and a wavelength dispersion compensator.

What is claimed is:

1. A method for manufacturing an optical fiber grating that includes first and second gratings that configure an optical resonator, the method comprising:

forming the first grating by radiating ultraviolet light to an optical fiber so that a irradiation intensity Z satisfies the following Equation 1:

$$Z \leq (\Delta\lambda S/x + 0.04556Y^2 + 1.2225Y)/(0.05625Y^2 + 1.6125Y) \quad \text{Equation 1,}$$

where, Z represents an irradiation intensity (mJ/mm2) of the ultraviolet light, $\Delta\lambda S$ represents the maximum shift amount of a reflection center wavelength of the first grating that is allowed as long as reflection wavelengths of the first grating and second grating overlap each other, x represents a shift amount of the reflection center wavelength per temperature change of 1° C. (nm/° C.) in the first grating, and Y represents an intensity (W) of the wave-guided light;

wherein x is a real number greater than zero and Y is a real number greater than zero.

2. The method for manufacturing an optical fiber grating according to claim 1,
wherein $\Delta\lambda S$ is smaller one of absolute values of differences between a reflection center wavelength of the second grating and each wavelength in which a reflective spectrum intensity becomes a half value in the first grating.

3. The method for manufacturing an optical fiber grating according to claim 1,
wherein, when the temperature change in the first grating is positive, $\Delta\lambda S$ is an absolute value of the difference between a reflection center wavelength of the second grating and a shorter one of wavelengths in which the reflective spectrum intensity becomes a half value in the first grating.

4. The method for manufacturing an optical fiber grating according to claim 1,
wherein the irradiation intensity of the ultraviolet light is 1 to 3 mJ/mm2.

5. An optical fiber grating that is obtained using the manufacturing method according to claim 1,
wherein the optical fiber grating satisfies at least one of the following Equations 4 to 6:

$$L700 \leq (\Delta\lambda S/x + 0.04556Y^2 + 1.2225Y)/(0.05625Y^2 + 1.6125Y)/17.825 \quad \text{Equation 4,}$$

$$L750 \leq (\Delta\lambda S/x + 0.04556Y^2 + 1.2225Y)/(0.05625Y^2 + 1.6125Y)/26.316 \quad \text{Equation 5,}$$

$$L800 \leq (\Delta\lambda S/x + 0.04556Y^2 + 1.2225Y)/(0.05625Y^2 + 1.6125Y)/40 \quad \text{Equation 6,}$$

where, L700 represents a loss amount per 1 mm (dB/mm) in the length of the first grating when wave-guided light having a wavelength of 700 nm is propagated, L750 represents a loss amount per 1 mm (dB/mm) in the length of the first grating when wave-guided light having a wavelength of 750 nm is propagated, and L800 represents a loss amount per 1 mm (dB/mm) in the length of the first grating when wave-guided light having a wavelength of 800 nm is propagated.

6. The optical fiber grating according to claim 5,
wherein the optical fiber grating satisfies all of Equations 4 to 6.

7. A fiber laser comprising the optical fiber grating according to claim 5.

* * * * *